United States Patent
Thomas et al.

(10) Patent No.: US 10,574,165 B2
(45) Date of Patent: Feb. 25, 2020

(54) INPUT VECTOR SET FOR POSITION DETECTION OF PM MOTORS

(71) Applicant: TEXAS INSTRUMENTS INCORPORATED, Dallas, TX (US)

(72) Inventors: Eric James Thomas, Ann Arbor, MI (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/288,327

(22) Filed: Feb. 28, 2019

(65) Prior Publication Data

US 2019/0199259 A1 Jun. 27, 2019

Related U.S. Application Data

(63) Continuation of application No. 15/916,945, filed on Mar. 9, 2018, now Pat. No. 10,263,555, which is a
(Continued)

(51) Int. Cl.
*H02P 21/18* (2016.01)
*H02P 21/24* (2016.01)
(Continued)

(52) U.S. Cl.
CPC ............ *H02P 21/18* (2016.02); *H02P 21/24* (2016.02); *H02P 25/03* (2016.02); *H02P 27/08* (2013.01)

(58) Field of Classification Search
CPC .......... H02P 27/04; H02P 27/06; H02P 21/00; H02P 21/32; H02P 6/00; H02P 1/00;
(Continued)

(56) References Cited

U.S. PATENT DOCUMENTS 5,254,914 A * 10/1993 Dunfield ................... H02P 6/22
318/400.09
5,903,129 A 5/1999 Okuno et al.
(Continued)

FOREIGN PATENT DOCUMENTS

CN 103503303 1/2014
CN 103684139 3/2014

OTHER PUBLICATIONS

Chinese Search Report from corresponding Chinese Patent Application No. 2015106133571, dated Dec. 5, 2018 (2 pages).

*Primary Examiner* — Antony M Paul
(74) *Attorney, Agent, or Firm* — John R. Pessetto; Charles A. Brill; Frank D. Cimino

(57) ABSTRACT

A method of determining angular position (θ) of a rotor of an N-phase permanent magnet motor (PMM). A processor having an associated stored angular position determination (APD) algorithm is programmed to implement the algorithm to cause an associated motor controller to execute steps including forcing one vector at a time a phase vector set of current or voltage vectors to stator terminals of windings for the N-phases a positive and negative magnitude vector, wherein the vector magnitude is sufficiently small to not move the rotor, and a time duration for the forcing current or voltage vectors is essentially constant. The resulting stator current or voltage levels are measured for each current or voltage vector. An N-dimension current vector or voltage vector is generated from superposition of the resulting stator current levels or resulting stator voltage levels. The N-dimension current vector or voltage vector is used to determine angular position.

12 Claims, 6 Drawing Sheets

Related U.S. Application Data continuation of application No. 15/250,306, filed on Aug. 29, 2016, now Pat. No. 9,917,542, which is a continuation of application No. 14/721,786, filed on May 26, 2015, now Pat. No. 9,431,947.

(60) Provisional application No. 62/054,498, filed on Sep. 24, 2014.

(51) Int. Cl.
*H02P 25/03* (2016.01)
*H02P 27/08* (2006.01)

(58) Field of Classification Search
CPC ...... H02P 7/00; H02P 6/14; H02P 1/46; H02P 3/18; H02P 23/00; H02P 27/00; H02P 21/14; G05B 11/28; G05B 11/01; G05B 13/00; H02K 29/06
USPC ....... 318/400.02, 400.01, 560, 650, 652, 55, 318/700, 400.04, 400.07, 400.12, 400.14, 318/400.15, 400.32, 701, 715, 721, 725, 318/727, 799, 800, 801, 805, 808, 809, 318/812, 254.1, 430, 432, 437, 490, 504, 318/599, 811, 807; 388/800, 847, 907.5
See application file for complete search history.

(56) References Cited

U.S. PATENT DOCUMENTS

| | | | |
|---|---|---|---|
| 6,208,110 B1 | 3/2001 | O'Meara et al. | |
| 6,583,593 B2 * | 6/2003 | Iijima | H02P 6/18 318/400.02 |
| 6,734,666 B2 | 5/2004 | Voillat | |
| 8,179,065 B2 | 5/2012 | Matsuo | |
| 8,330,403 B2 | 12/2012 | Basic et al. | |
| 8,674,638 B2 | 3/2014 | Balazovic et al. | |
| 8,853,979 B2 * | 10/2014 | Wu | H02P 6/20 318/400.02 |
| 9,270,223 B2 * | 2/2016 | Wu | H02P 27/08 |
| 2012/0217912 A1 | 8/2012 | Wu et al. | |
| 2014/0327379 A1 | 11/2014 | Yang et al. | |

* cited by examiner

INPUT VECTOR SET FOR POSITION DETECTION OF PM MOTORS

CROSS REFERENCE TO RELATED APPLICATIONS

This continuation application claims priority to U.S. patent application Ser. No. 15/916,945, filed Mar. 9, 2018, which application claims priority to U.S. patent application Ser. No. 15/250,306, filed Aug. 29, 2016, which application claims priority to U.S. patent application Ser. No. 14/721,786, filed May 26, 2015, which application claims priority to and the benefit of Provisional Application Ser. No. 62/054,498, filed Sep. 24, 2014, all of which are herein incorporated by reference in their entirety.

FIELD

Disclosed embodiments relate to permanent magnet motors (PMMs), and more specifically to determining the angular position of PMMs for use by a motor controller for position, velocity or current/torque control of the PMM.

BACKGROUND

An electric motor is a machine that converts electrical energy into mechanical energy. Electric motors include DC motors and AC motors. One type of AC motor is an AC induction motor. An AC induction motor is typically driven by 3-phase alternating current provided by an electric motor controller coupled to a 3-phase inverter. The AC motor includes an outside stationary stator having coils supplied with alternating current to produce a rotating magnetic field, which induces a current in the rotor windings. As the current flows through the rotor windings, a second magnetic field is generated which interacts with the magnetic field from the stator to produce motion. The rotor is attached to the output shaft that is given a torque by the rotating magnetic field. The interaction of the rotor field and the stator field causes rotation of the rotor which can be used to perform work.

Another type of AC motor is a PMM. PMMs have permanent magnets located on the rotor and copper windings located on the stator. The alternating current in the stator windings produces a rotating magnetic field which interacts with the magnetic field from the rotor magnets to produce motion. The frequency at which the stator current oscillates determines the rotor's angular velocity and the resulting angular position.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include permanent magnet motors (PMM) motor controllers implementing current or voltage sensed control for controlling N-phase PMMs that include a disclosed motor control system and a related rotor angular position determination (APD) algorithm and velocity estimation algorithm. The APD system includes a controller (APD controller) block that determines the state of the position detection system and the resulting input signal for the position detection algorithm, a signal generator (SIG GEN) block that provides signals used for generating a voltage or current input vector set coupled to the stator terminals of the PMM, and an estimation (EST) block that implements the APD algorithm and velocity estimation algorithm.

The control scheme utilized with disclosed APD algorithms can be field oriented control (FOC). However, disclosed APD algorithms are independent of the control system as they can be operate in phase coordinates which removes the need for FOC. Other control schemes which can be used include the motor controller operating in the $\alpha/\beta$ frame, where the voltage/current in each coordinate is independently controlled which is then transformed via a space vector (SV) generator to the A/B/C frame. The motor controller can also operate in the A/B/C frame to allow control of the voltage/current of each motor phase directly.

Disclosed angular position determination systems and related methods determine the initial angular position at zero speed or near zero speed. A processor has an associated memory storing an APD system including an APD controller algorithm which implements an APD controller block, a SIG GEN algorithm which implements a SIG GEN block, and an estimator algorithm which implements an EST block. The processor is programmed to implement the APD controller algorithm to execute steps that cause a SIG GEN algorithm to force a phase vector set comprising voltage or current vectors one vector at a time to stator terminals of the stator windings, measure resulting stator current or voltage levels, implement an APD algorithm that generates an N-dimension current vector or voltage vector from the measured current or voltage levels, and uses the N-dimension current vector or voltage vector to determine the angular position.

The phase vector set includes a positive magnitude vector and a negative magnitude vector for applying to each of the N stator windings. A magnitude of the current vectors or voltage vectors used are all sufficiently small to not move the rotor, and a time duration for the forcing the respective vectors is essentially fixed for a given motor.

BRIEF DESCRIPTION OF THE DRAWINGS

Reference will now be made to the accompanying drawings, which are not necessarily drawn to scale, wherein.

DETAILED DESCRIPTION

Figure 1A:
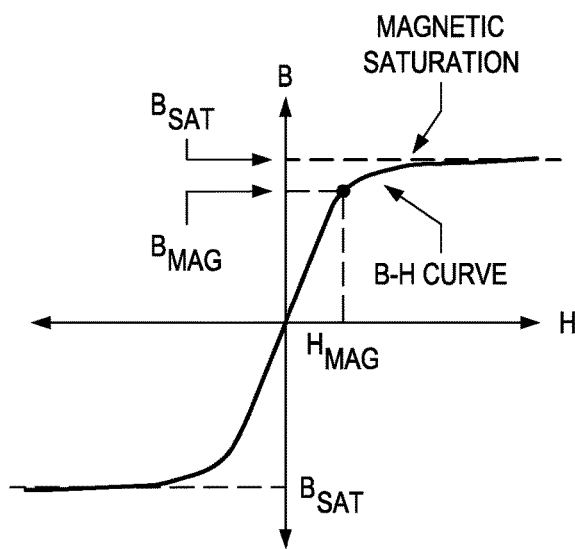
FIG. 1A is a plot of magnetic flux density B, and how it typically varies as a function of magnetic field strength, H, for typical PMM stator core material such as iron.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Before the disclosed angular position algorithm is developed below, the dependence of the motor reluctance on the angular position of the motor rotor is explained. The magnetic model of a surface mounted PMM assumes that the stator resistance and inductance values are constant, which is true as long as the magnetic system (motor windings, motor stator poles, motor rotor permanent magnets) is operating along the linear region of the B/H curve as shown in the typical B/H curve for an iron stator core of a PMM. FIG. 1A plots magnetic flux density, B, with units of tesla, (1 tesla=1 Wb/m$^2$) as a function of magnetic field strength, H, with units of A/m for a given rotor angular position that shows how B typically varies with H. It is noted that B is proportional to voltage (Wb=V·sec/rad) and H is proportional to the stator winding current.

It can be noticed in FIG. 1A that there is a linear region between zero and Bmag, a nonlinear region and a saturation region for both positive and negative B field strengths. The operating point on the B/H curve is determined by the flux generated by the permanent magnets mounted to the PMM's rotor, as shown by the point ($H_{mag}$, $B_{mag}$) in FIG. 1A. The exact location of the operating point depends on the field strength of the permanent magnet, the field strength of the iron core generated by the current flowing through the stator windings and the orientation of the permanent magnets with respect to the stator windings.

Figure 1C:
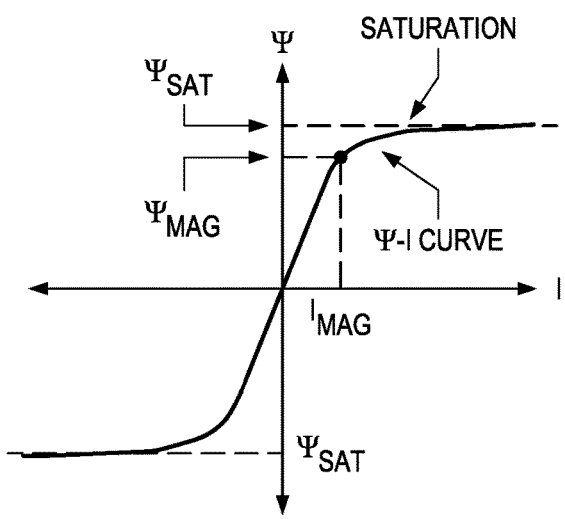
FIG. 1C is a plot of the magnetic flux, $\psi$, as a function of current, I, for a typical PMM stator core.
Figure 1B:
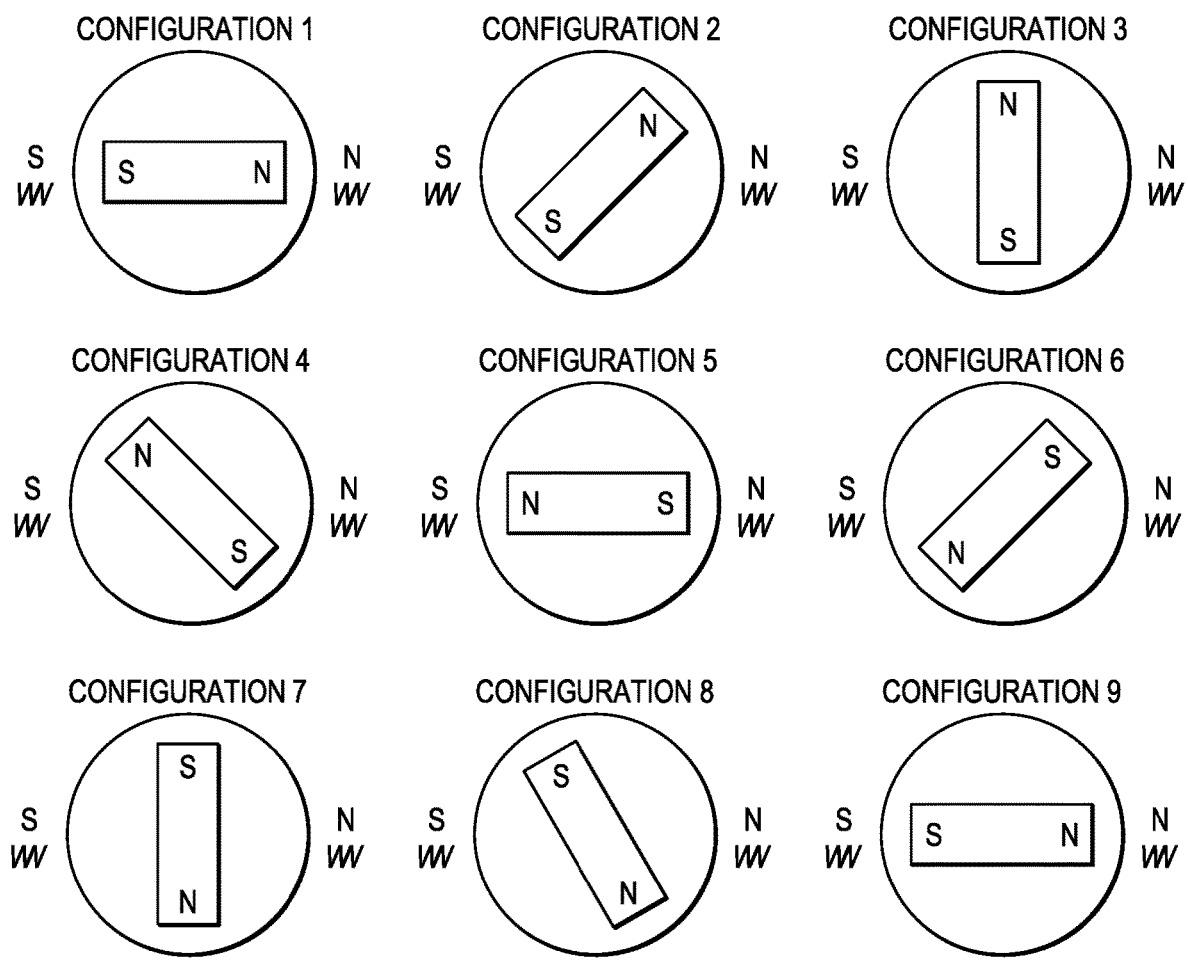
FIG. 1B is a B-H curve showing operating point vs. angular position of the rotor.
Figure 1B:
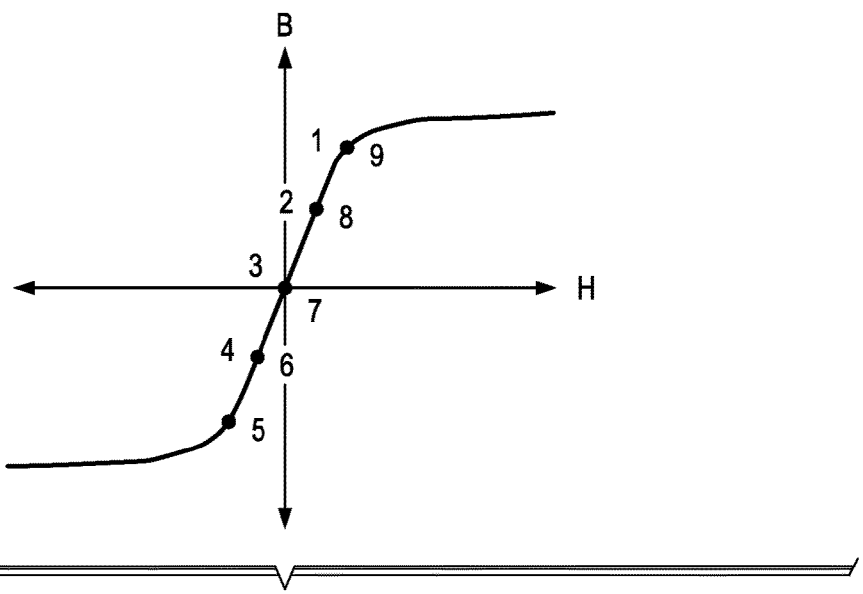

FIG. 1B is a B-H curve showing the operating point vs. rotor orientation (angular position). The magnetic operating point of the PMM's stator core as a function of rotor angular position with respect to a stator winding for several orientations around one electrical cycle ($2\pi$). The distance between the points on the curve depends upon the orientation of the rotor with respect to the energized stator winding, the current level in the stator winding and the magnetic permeability of the stator core material. Notice that a zero value of flux density corresponds to the case when the magnet orientation on the rotor is orthogonal to the stator winding (see Config. 3 and Config. 7).

By integrating B over the cross section of the stator core and integrating H along the enclosed flux path, the B/H curve can be translated into a $\Psi/I$ (e.g., magnetic flux versus stator current) curve as shown in FIG. 1C which shows a typical $\psi$-I curve for a PMM stator core. For PMMs, the operating point on the $\Psi/I$ curve is determined by the magnetic flux generated by these magnets, as shown by the point ($I_{mag}$, $\Psi_{mag}$) in FIG. 1C as well as the orientation of the rotor with respect to the stator windings. Just as with the B/H curve, the operating points of the $\Psi/I$ curve vary as a function of the rotor orientation.

The slope of the $\Psi/I$ curve at any point is the inductance (L) of the stator core, since:

$$\Psi = L \cdot i$$

As a result, for a given inductance level and $\psi$ level in the stator core, it is recognized that the level of the stator current (i) can be determined.

When a voltage is applied to a stator terminal coupled to stator winding(s) of a particular PMM phase, the operating point on the B/H curve (and thus the $\Psi/I$ curve) moves and the current level in the stator winding(s) of each phase changes. The duration of the voltage applied will determine the actual stator current (i) level. To see how this behavior can be modelled mathematically, consider the following definition for $\psi$:

$$\Psi = \iint_A \vec{B} \cdot \vec{dA}$$

which is a vector surface integral of the magnetic flux density (B) that is perpendicular to the surface of interest (which in this case is the cross sectional area of the PMM stator pole). The definitions and units of the variables found in the equation above are as follows:

$\Psi$ is the magnetic flux, in Wb $\vec{B}$ is a vector representing the magnetic flux density, Wb/m$^2$ $\vec{dA}$ is vector that is normal to the surface, in units of m$^2$ Since a Weber (e.g. Wb) is equal to a (V·sec)/rad, it is recognized one can simply apply a voltage to the PMM stator windings for the required amount of time needed to generate a stator current for reaching the desired $\psi$ value. This concept can be expressed mathematically as:

$$\Psi(t_2) = \Psi(t_1) + \int_{t_1}^{t_2} V \cdot dt$$

As the $\Psi$ changes in value, the current (i) changes according to the following relationship $$i = \frac{\Psi}{L}$$

As a result, the current level (i) in a given phase (stator winding) becomes a function of rotor angular position (orientation) since the flux changes with angular position.

From a magnetic circuit perspective, the flux, Ψ, in the motor is related to the magnetomotive force, F, of the magnetic circuit and the reluctance, R, of the motor by the following relationship:

$$\Psi = \frac{F}{R}$$

Since the applied voltage, V, is constant, the resulting magnetomotive force, F, will also change over time because the current level in the winding will increase as the voltage is applied. Using the reluctance relationship above, a reluctance value for a given angle orientation can be computed. For each new angle position, the flux and magnetomotive force values will converge to a new operating point (i.e. flux vs. magnetomotive point) due to the different flux bias caused by the rotor's magnets. As a result, the motor reluctance can be used to develop an angular position detection algorithm.

An example angular position determination system is now derived using voltage vector inputs to the stator terminals of a 3-phase PMM and resulting stator current outputs. As noted above, current mode control may alternatively be used. In the current mode control embodiment, a current input vector sequence is used as the input vector set, again chosen to satisfy the system constraint that the rotor does not move during initial position detection.

Since many different voltage input sequences can be used, a set of input voltage vectors is chosen that satisfies the system constraint that the rotor does not move during initial position detection. An example input voltage sequence chosen for a 3-phase PMM can contain two sets of orthogonal phase vectors, one set is the fundamental positive magnitude phase vector set and one is the fundamental negative magnitude phase vector set, which for 3 phases shown as a, b and c can be written as:

Positive Mag Vector Set:

$$\begin{bmatrix} V_a \\ V_b \\ V_c \end{bmatrix} = \begin{bmatrix} v_a \\ 0 \\ 0 \end{bmatrix} \begin{bmatrix} V_a \\ V_b \\ V_c \end{bmatrix} = \begin{bmatrix} 0 \\ v_b \\ 0 \end{bmatrix} \begin{bmatrix} V_a \\ V_b \\ V_c \end{bmatrix} = \begin{bmatrix} 0 \\ 0 \\ v_c \end{bmatrix}$$

Negative Mag Vector Set:

$$\begin{bmatrix} V_a \\ V_b \\ V_c \end{bmatrix} = \begin{bmatrix} -v_a \\ 0 \\ 0 \end{bmatrix} \begin{bmatrix} V_a \\ V_b \\ V_c \end{bmatrix} = \begin{bmatrix} 0 \\ -v_b \\ 0 \end{bmatrix} \begin{bmatrix} V_a \\ V_b \\ V_c \end{bmatrix} = \begin{bmatrix} 0 \\ 0 \\ -v_c \end{bmatrix}$$

Note that other orthogonal phase vectors sets can be used but the above set is a fundamental vector set because only one phase of the motor in energized at a time, which simplifies the APD algorithm. However, the above phase vectors sets are only example voltage vector sets and different input voltage vector sets (or input current voltage sets) can be applied without changing the fundamental operation of the algorithm provided the system constraint that the rotor does not move during angular position detection is satisfied.

In the case of voltage forcing, by forcing the voltage vector in each input vector set for essentially the same time duration, the resulting stator current levels in each phase can be measured and recorded. Once the current values for all six applied phase vectors have been recorded (e.g., saved to memory), superposition can be used by the APD algorithm to construct a current vector that represents the effective current level in the stator winding(s) of each phase of the PMM so that the rotor's angular position can be determined.

Once the resulting N-dimension current vector has been determined, as noted above the angular position of the rotor can be found for example by an angular position determination equation for a 3 phase PMM based on N-phase measurements $(x_1, \ldots, x_N)$, where ia(t), ib(t), and ic(t) are the N-phase current vector elements in the APD equation shown below:

$$\theta = \tan^{-1}\left(\frac{\frac{\sqrt{3}}{2} \cdot (i_c(t) - i_b(t))}{i_a(t) - \frac{1}{2} \cdot (i_b(t) + i_c(t))}\right)$$

for using the APD equation above, there are several methods to obtain the needed ia, ib and ic (or va, vb, and vc for current forcing). For voltage forcing, one can use different phase input vector sets, perform mathematics to determine ia, ib and ic, then use the APD equation. There are a large number of possible linear combinations of the fundamental positive and negative vector sets that can be used besides the fundamental vector sets described above. For example, the following positive and negative vector sets can also be used.

Positive Mag Vector Set:

$$\begin{bmatrix} V_a \\ V_b \\ V_c \end{bmatrix} = \begin{bmatrix} 0 \\ -v_b \\ v_c \end{bmatrix} \begin{bmatrix} V_a \\ V_b \\ V_c \end{bmatrix} = \begin{bmatrix} v_a \\ -0.5 \cdot v_b \\ -0.5 \cdot v_c \end{bmatrix}$$

Negative Mag Vector Set:

$$\begin{bmatrix} V_a \\ V_b \\ V_c \end{bmatrix} = \begin{bmatrix} 0 \\ v_b \\ -v_c \end{bmatrix} \begin{bmatrix} V_a \\ V_b \\ V_c \end{bmatrix} = \begin{bmatrix} -v_a \\ 0.5 \cdot v_b \\ 0.5 \cdot v_c \end{bmatrix}$$

Also, one can repeat a given phase input vector set a plurality of times, average the resulting current (or voltage) sample values, and then use the average values in the APD equation. One can also average the positive and negative sequences together and then use the average values in the APD equation. Design parameters for disclosed APD algorithms thus comprise what type of voltage (or current) signal to use, the time duration of the voltage (or current) signals and the method for determining angular position of the rotor from the N-phase measurements $(x_1, \ldots, x_N)$ in the N-dimension current (or voltage) vector.

A significant benefit of using the disclosed six fundamental phase vectors (or more generally 2 vectors per phase) is that the current level in each phase winding can be easily controlled. By energizing only one phase at a time, better control of the magnetic interaction between the magnetic field generated by the stator windings and the magnetic field from the rotor magnets can be achieved. As a result, there is less risk of rotating the rotor.

Disclosed embodiments include angular position determination systems and PMM motor controllers therefrom including an angular position determination system comprising an APD controller algorithm, a SIG GEN algorithm, an EST algorithm for determining the initial angular position and velocity of the rotor of PMMs at zero speed or near zero speed. It is recognized that there are two primary magnet configurations for PMMs, being surface mount magnet and interior mounted magnet types. For PMMs with surface mounted magnets, the inductance does not vary as a function of angular position during normal operating conditions. As a result, initial angular position detection based on inductance variations can only be used with interior mounted PMMs.

However, as shown previously, the reluctance of both of these PMM types does vary as a function of angular position of the rotor during normal operating conditions. As a result, it is recognized that this property (the reluctance of PMMs varying as a function of angular position of the rotor) can be used to design an initial or low speed angular position detection algorithm for both types of PMMs. A disclosed angular position detection system uses the magnetic properties of the PMM and employs an APD controller algorithm which determines the state of the APD algorithm and specifies the desired signals needed by the APD algorithm, and a SIG GEN algorithm enabling a phase voltage or current input vector set to be applied to the terminals of the stator windings to allow the measurement of current or voltage levels to provide an N-dimension current vector or voltage vector used by the APD algorithm to determine the initial angular position of the rotor at zero speed or near zero speed.

FOC is also called vector control which is known to be a variable frequency drive (VFD) control method that applies generally to all electric motors where there is a desire to control the magnetic flux of the motor in one direction and the torque produced the motor in a second direction, which is orthogonal to the first direction. FOC can control the output of three-phase motors by using two controllable VFD inverter output variables or can control the output of brushless DC motors. However, as described above, disclosed APD algorithms are independent of the control system as they can be operate in phase coordinates which removes the need for FOC. Other control schemes which can be used with disclosed embodiments include the motor controller operating in the alpha/beta ($\alpha,\beta$) frame.

Figure 2A:
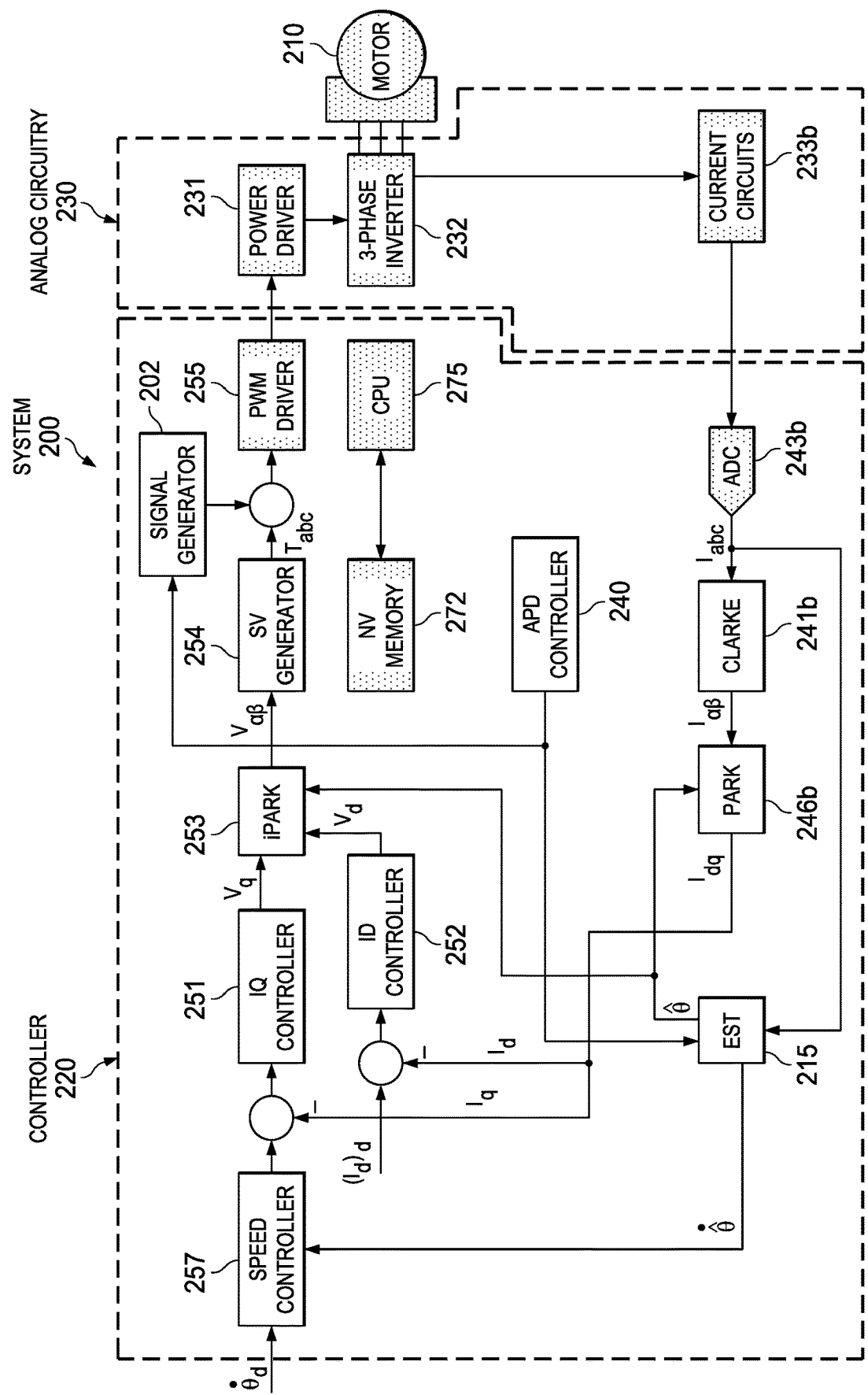
FIG. 2A is a block diagram of a motor control system with a motor controller for implementing current sensed control for controlling a three-phase PMM having a disclosed angular position determination system implementing current sensed control including an APD controller block that determines the state of the angular position determination system and specifies the desired signals needed by the SIG GEN block and the APD algorithm, a SIG GEN block that provides signals used for generating a voltage input vector set coupled to the stator terminals, and an EST block, according to an example embodiment.

FIG. 2A shows an example block diagram of a controlled motor system 200 including a motor controller (controller) 220 for implementing current sensed control for controlling a PMM 210 shown as a three-phase motor having a disclosed angular position determination system which includes the APD controller block (APD controller) 240, according to an example embodiment. APD controller 240 determines the state of the angular position determination system and specifies the state to the signal generator (SIG GEN) block 202 and to the estimator (EST) block. The SIG GEN block 202 provides signals used for generating a voltage input phase vector set coupled to the stator terminals and the EST block 215 that runs the APD algorithm. Controller 220 includes a non-volatile (NV) memory 272, such as read only memory (ROM) or static random access memory (SRAM), and a processor shown as a central processing unit (CPU) 275 that implements in software all the blocks in the unshaded (non-dotted) blocks shown in FIG. 2A. Hardware components of system 200 such as CPU 275 and NV memory 272 are shown in dotted blocks to distinguish them from components of system 200 implemented in software.

The output of SIG GEN block 202 is added with the Tabc output of the SV generator 254 which is used as the input of the PWM driver 255. The SIG GEN block 202 receives a desired phase voltage signal from the APD controller 240. The signals provided by SIG GEN block 202 controls the amplitude and duration of the input waveforms (here voltage waveforms) applied by the 3-phase inverter 232 to the respective stator windings of each phase of the PMM 210 to enable measuring resulting stator current levels, generating an N-dimension current vector or voltage vector from the measured current or voltage levels, and the EST block 215 to use the N-dimension current vector to determine angular position determination. SIG GEN block 202 is synchronized with the EST block 215 by the APD controller 240 telling the EST block 215 which state it is in.

System 200 also includes analog circuitry 230 between the controller 220 and the PMM 210 comprising power driver 231, 3-phase inverter 232, and current measurement circuits 233b. The controller 220 includes analog-to-digital converters (ADC's) 243b coupled to receive outputs from the current measurement circuits 233b shown as "current circuits", and a PWM driver 255 for driving the power driver 231.

The controller 220 can be a sensorless controller or can be a controller having a voltage or current sensor. Controllers having sensors can include encoders and sensors that measure position directly and then determine the angular speed therefrom. Controller 220 can be implemented by a MCU, such as the MCU chip 300 shown in FIG. 3 described below. Circuitry other than a MCU can also be used to realize controller 220 implementing a disclosed APD controller block 240, a disclosed EST block 215 and SIG GEN block 202 algorithm, such as coprocessors or accelerators built using application-specific integrated circuit (ASIC) logic gates or FPGAs.

The ADC's 243b output phase currents are also coupled to the input of the EST block 215. The EST block 215 generates for each phase current an angular position estimate $\hat{\theta}$ and angular velocity estimate $\hat{\dot{\theta}}$. The $\hat{\theta}$ with a dot (.) above denote estimate angular velocity which is provided by $\theta$ EST block 215 to the speed controller 257 shown.

The ADC's 243b output phase currents shown as Iabc is coupled to an input of the Clarke block 241b which performs the known Clarke transformation which takes the measured current Iabc and transforms it into the $\alpha/\beta$ coordinate system to generate I$\alpha\beta$ from Iabc, which is coupled to an input of the Park block 246b. Park block 246b performs the known Park transformation to provide outputs Idq being measured phase current values from the stator terminals of the PMM 210 which are added to the input of the ID current controller 252 and to the input of the IQ current controller 251 as shown in FIG. 2A. The estimated angular position is shown coupled to an inverse Park (iPARK) block 253 which receives the Vq output from IQ controller 251 and the Vd output from the ID controller 252 as other inputs.

The angle position determined from the EST block 215 is coupled to the iPARK block 253, which outputs V$\alpha\beta$ which is coupled to SV generator block 254, where the output of SV generator block 254 is coupled to PWM driver 255. The SV generator 254 computes the PWM time durations (Tabc) for each phase of the PMM 210 to produce the desired V$\alpha\beta$ voltage values. The output of the PWM driver 255 is coupled to an input of a power driver 231 that has an output coupled to drive an input of the 3-phase inverter 232. In this embodiment current mode control embodiment the 3-phase inverter 232 forces voltage onto the stator terminals associated with each of the three phases of PMM 210.

Figure 2B:
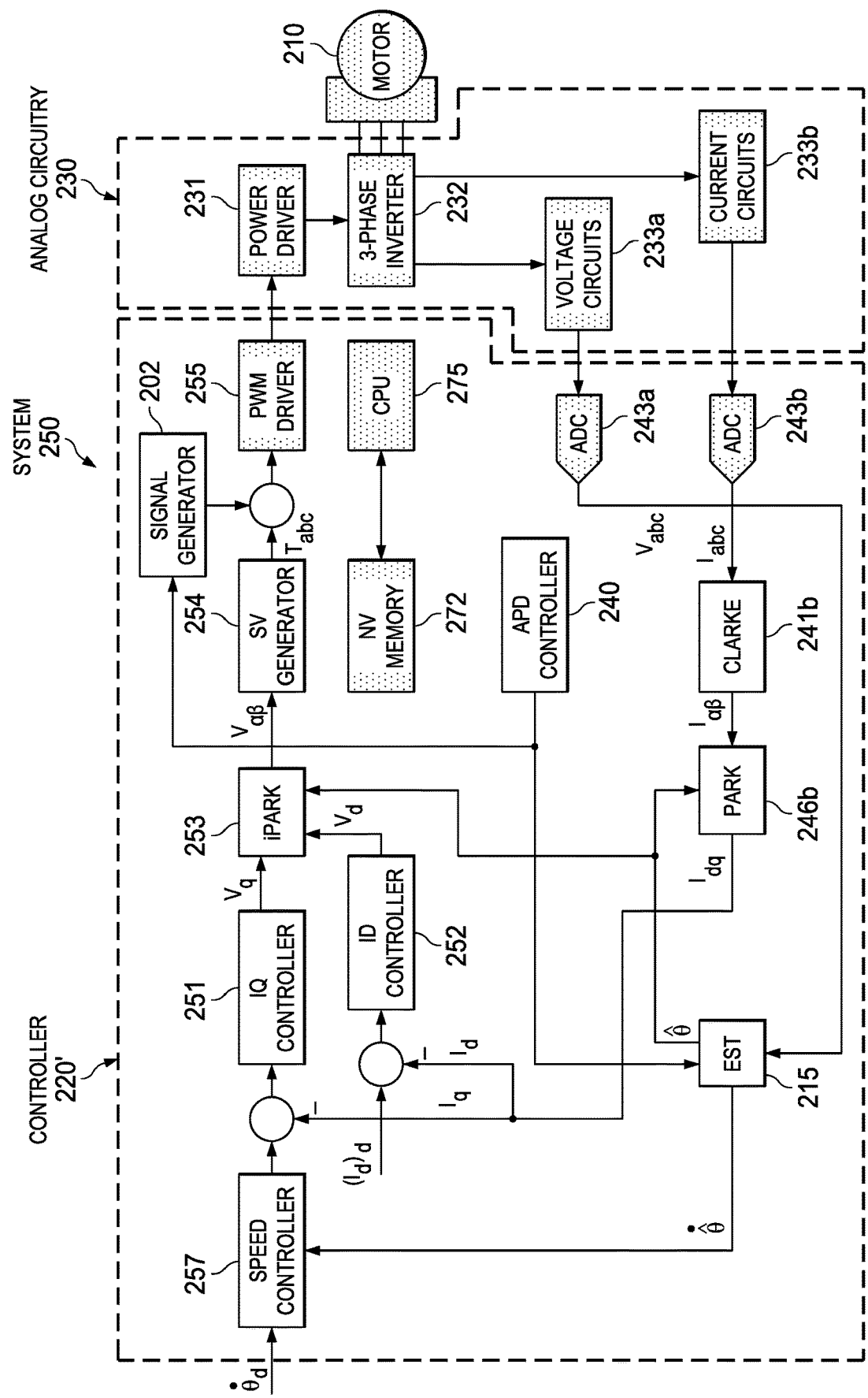
FIG. 2B is a block diagram of a motor control system with a motor controller for implementing voltage sensed control for controlling a three-phase PMM having a disclosed angular position determination system including an APD controller block that determines the state of the angular position determination system and specifies the desired signals needed by the SIG GEN block and the APD algorithm, a SIG GEN block that provides signals used for generating a current input vector set coupled to the stator terminals and an EST block, according to an example embodiment.

FIG. 2B shows an example block diagram of a controlled motor system 250 including a motor controller (controller) 220' implementing voltage sensed control having a disclosed angular position determination system including a SIG GEN block 202 that provides signals used for generating a current input vector set coupled to the stator terminals and an EST block 215', according to an example embodiment. Controlled motor system 250 resembles controlled motor system 200 shown in FIG. 2A except EST block 215' receives a Vabc input instead of an Iabc input (as for EST block 215 in FIG. 2A) that is generated by the voltage measurement circuits (voltage circuits) 233a coupled to an output of the 3-phase inverter 232. The output from voltage circuits 233a is coupled to ADC 243a which generates Vabc that is coupled to an input of the EST block 215'. In this voltage mode control embodiment the 3-phase inverter 232 forces current on each of the phases of the PMM 210.

Figure 3:
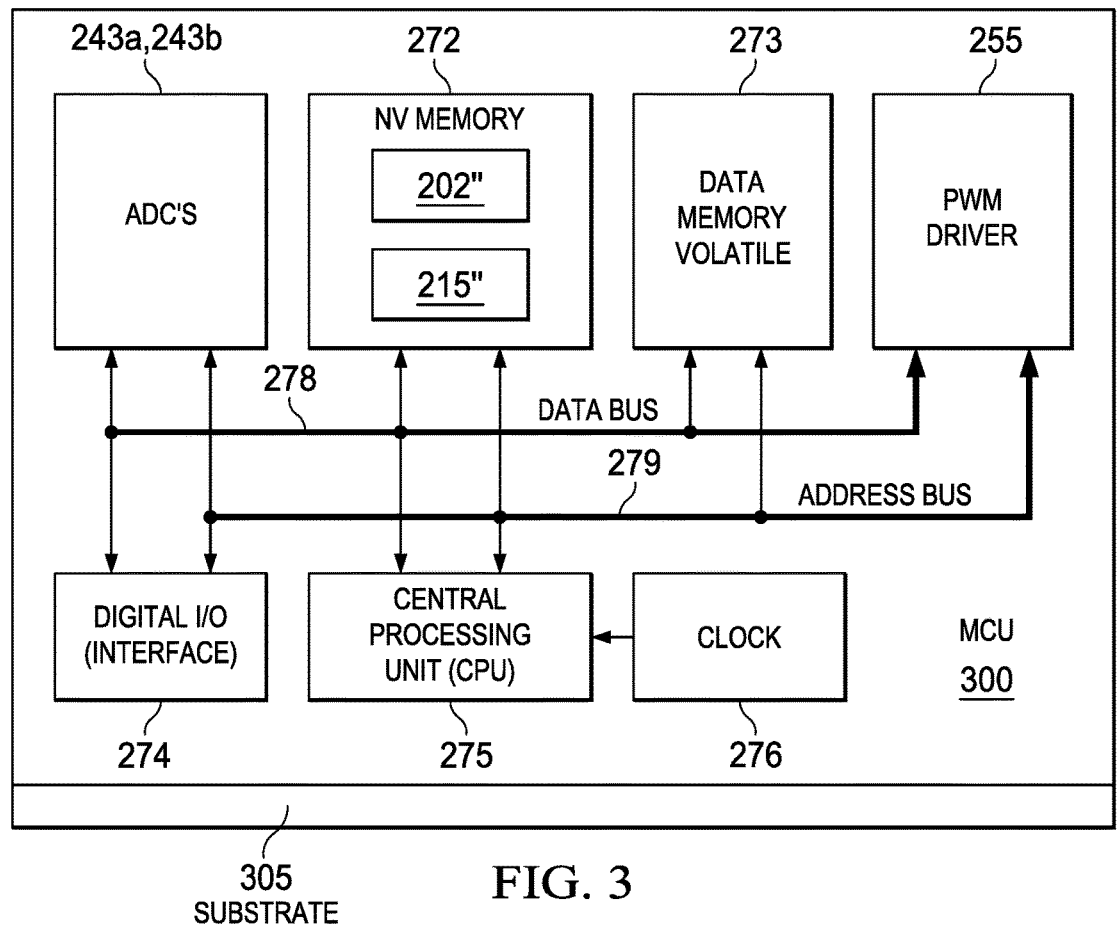
FIG. 3 is a block diagram of an example microcontroller unit (MCU) chip implementing the motor controller shown in FIG. 2A or FIG. 2B, according to an example embodiment.

FIG. 3 is a block diagram depiction of an example MCU chip 300 formed in and on a substrate 305 implementing the controller 220 shown in FIG. 2A or controller 220' shown in FIG. 2B, according to an example embodiment. Although not shown, the MCU chip 300 generally includes other integrated circuit modules, for example, a Universal Serial Bus (USB) controller and a transceiver. MCU chip 300 is shown including NV memory 272, volatile data memory 273, digital I/O (interface) 274, CPU 275, and clock (or timer) 276. Core for implementing the APD algorithm includes an EST block 215 or 215' shown as block 215" and a core for implementing SIG GEN block 202 is shown as 202" both stored in NV memory 272. MCU chip 300 is also shown including a digital data bus 278 and an address bus 279.

MCU chip 300 is shown as a monolithic integrated circuit (IC). The substrate 305 may comprise silicon, such as bulk silicon or silicon epi on a bulk silicon substrate. The substrate 305 may also generally comprise other materials, such as elementary semiconductors besides silicon including germanium. Substrate 305 may also generally comprise a compound semiconductor.

Benefits of disclosed APD algorithms from using input voltage or current values in a vectorized manner to determine the angular position of a rotor for zero speed or near zero speed of a PMM for controlling PMMs include allowing the PMM to be started under motor control under a full load. An arbitrary voltage (or current) input waveform can be used. The six vector input vector set method disclosed for 3-phase PMMs does not rotate the rotor of the PMM. A tuning procedure described in the Examples section below can be used to determine the voltage or current vector magnitude and time duration for the input vectors. North-south rotor orientation is also determined automatically.

Disclosed algorithms can be implemented for angular position determination for a variety of PMM controllers, for example for the Texas Instruments' INSTASPIN-FOC sensorless motor control technology, such as for PICCOLO and POTENZA MCU chip-based motor controllers. The angular position determination can be used for position control, velocity control or current/torque control of the PMM. In the case of INSTASPIN-FOC technology and related technology, code for the disclosed APD algorithms can be embedded in the ROM of the MCU chip (see NV memory 272 in FIG. 2B), such as to accelerate motor control development while improving efficiency. PMM control applications include for washing machines, compressors, pumps, fans, electric bicycles, tools, treadmills, compact drives, sewing and textile machines, lifts and hobby motors.

EXAMPLES

Disclosed embodiments are further illustrated by the following specific Examples, which should not be construed as limiting the scope or content of this Disclosure in any way.

Figure 4:
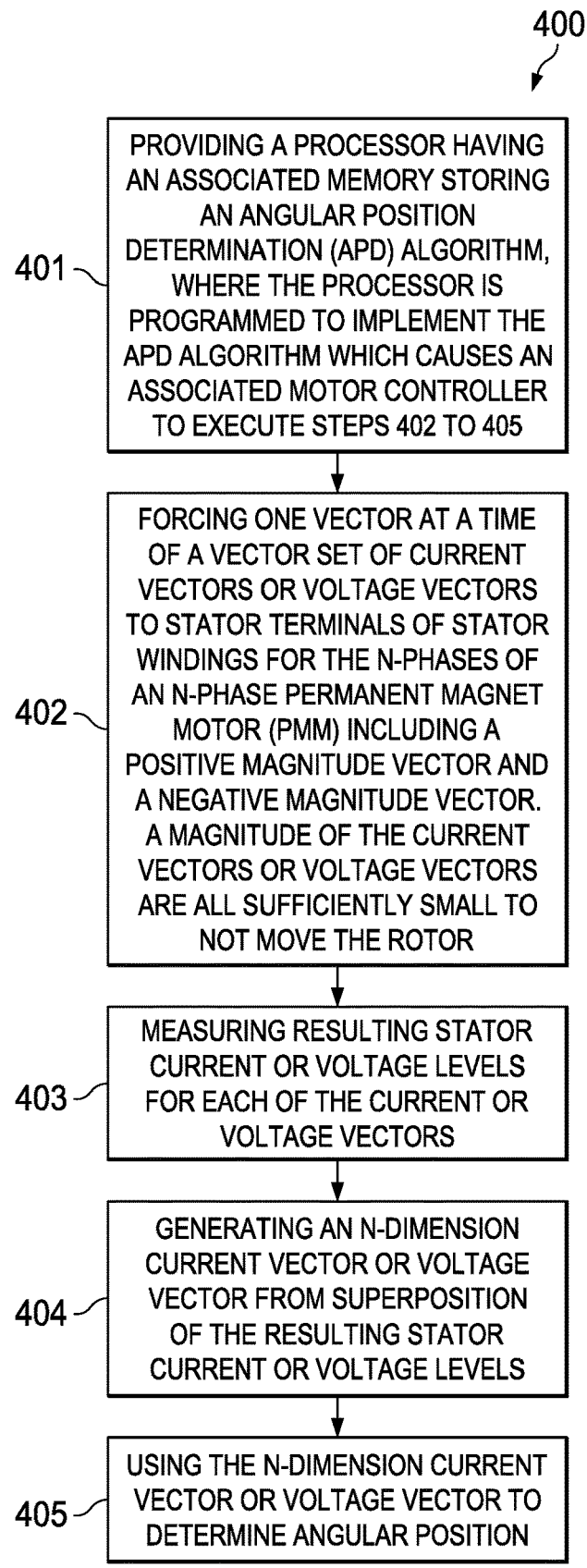
FIG. 4 is a flow chart that shows steps for an example method for determining the angular position of a rotor of a PMM using an input phase vector set, according to an example embodiment.

FIG. 4 is a flow chart that shows steps for an example method 400 of determining the angular position of a rotor in an N-phase PMM using an input vector set, according to an example embodiment. Step 401 comprises providing a processor having an associated memory storing an APD system, where the processor is programmed to implement the APD algorithm which causes an associated motor controller in a control loop with the PMM through connection to its respective stator phase winding terminals to execute steps 402 to 405.

Step 402 comprises forcing one vector at a time a vector set of current vectors or voltage vectors to the terminals of stator phase windings for the N-phases of the PMM including a positive magnitude vector and a negative magnitude vector. The magnitude of the current vectors or voltage vectors are all sufficiently small to not move (rotate) the rotor. A time duration for the forcing of the respective current vectors or voltage vectors is essentially fixed for a given motor.

Step 403 comprises measuring the resulting stator current or voltage levels for each of the current or voltage vectors. The resulting stator current or voltage levels are generally stored in a suitable memory. Step 404 comprises generating an N-dimension current vector or voltage vector from superposition of the resulting stator current or voltage levels. For each of the N-dimensions of the resulting current or voltage vector, the largest absolute value of the current or voltage between the positive and negative voltage or current vectors can be used.

Step 405 comprises using the N-dimension current vector or voltage vector to determine the angular position of the rotor. As noted above, in one embodiment the forcing comprises forcing voltage and sensing comprises sensing resulting stator current. The sensing of the resulting stator current as known in the art can comprise using a circuit component such as a resistor or a current sensor. In one particular embodiment the following position determination equation is employed which uses the N-resulting current levels in the N-dimension resulting current vector to determine the angular position (θ) of the rotor for a N-phase PMM.

$$\theta = \tan^{-1}\left(-\frac{\sum_{n=1}^{N} x_n \cdot \sin\left(\frac{2\pi \cdot (n-1)}{N}\right)}{\sum_{n=1}^{N} x_n \cdot \cos\left(\frac{2\pi \cdot (n-1)}{N}\right)}\right)$$

wherein N-phase measurements (i.e. $x_1, \ldots, x_N$) (i.e., levels of current or voltage for phases 1, 2, . . . , N) are sensed from the stator current or stator voltage waveforms. Note, the above equation assumes that the respective phase responses have the same magnitude.

The above angular position determination equation or any other equation described herein may be implemented by either hardware or by software. Regarding hardware-based implementations, a disclosed θ equation can be converted to a logic gate pattern, such as using VHDL which can then be realized such as using field-programmable gate array (FPGA) or application-specific integrated circuit (ASIC) to implement the logic gate pattern. VHDL is an acronym which stands for VHSIC (Very High Speed Integrated Circuits) Hardware Description Language. For example, a software-based implementation can be realized using a math library on a MCU chip.

Figure 5:
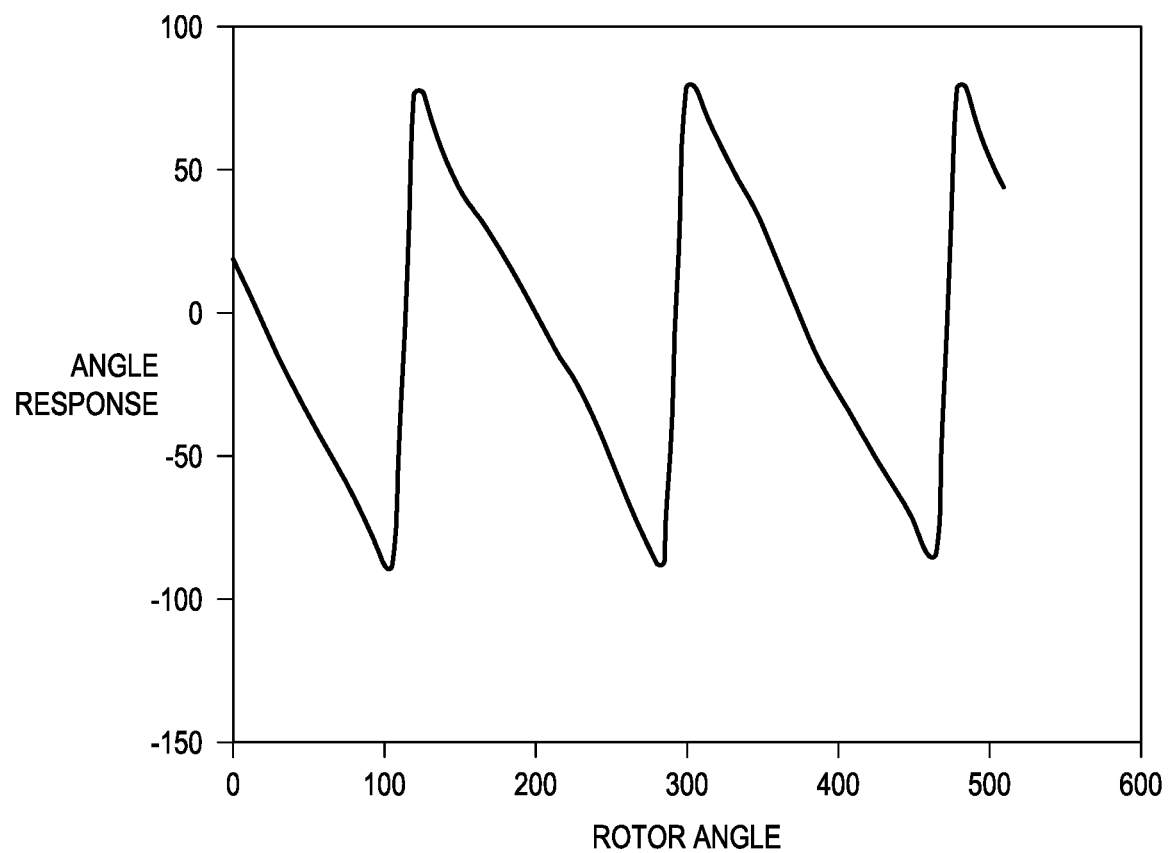
FIG. 5 show experimental results from applying a disclosed APD algorithm to a surface mounted PMM, showing the calculated angular position of the rotor vs. actual angular position of the rotor at 10 degree increments.

Experimental results were obtained from applying a disclosed initial APD system to a surface mounted PMM, the Estun Model #EMJ-04APB22 PMM, with the results being calculated rotor angle response vs. rotor position as a function of rotor angle at 10 degree increments shown in FIG. 5. The DC bus voltage was 380V and the pulse time was 200 μs. It can be noticed that there are a few nonlinear regions in the angle response due to the nonlinearities in the stator current waveforms. This phenomenon can be attributed to either the stator windings not being sinusoidal in shape or to the stator core being driven into saturation when that stator phase is energized at the given rotor orientation. When driven into saturation, the inductance of the stator changes, which introduces a nonlinear warping into the current response because the current does not reach the level that it would have reached had the inductance not changed. As a result, the stator current waveform can appear slightly warped. However, the linearity of the rotor angle response is still within tolerable limits for acceptable motor control of the PMM, which has an error of less than two degrees.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A motor control system comprising:
an analog-to-digital converter (ADC) for receiving N-phase measurements from stator windings;
a processor wherein the processor receives digital values of the N-phase measurements from the ADC; wherein the processor is configured to generate N-dimension voltage vectors from superposition of selected ones of the digital values of the N-phase measurements;
a non-volatile program memory wherein the non-volatile program memory includes an angular position determination (APD) algorithm; wherein APD algorithm determines the angular position based on the N-dimension voltage vectors;
a pulse-width modulation (PWM) driver wherein the PWM driver generates a set of input vectors;
an APD controller for controlling a signal generator; wherein the signal generator generates signals for the PWM driver.

2. The micro control system of claim 1, wherein the N-dimension voltage vectors are fundamental vectors.

3. The micro control system claim 1, wherein the angular position determination is determined by:

$$\theta = \tan^{-1}\left(-\frac{\sum_{n=1}^{N} x_n \cdot \sin\left(\frac{2\pi \cdot (n-1)}{N}\right)}{\sum_{n=1}^{N} x_n \cdot \cos\left(\frac{2\pi \cdot (n-1)}{N}\right)}\right)$$

wherein said $x_n$ is stator voltage level.

4. The micro control system of claim 1, wherein the selected ones of the digital values of the N-phase measurements are identified for each of the N-phase measurements by determining a largest absolute value of a difference between stator voltage levels from the positive magnitude vector and the negative magnitude vector.

5. The micro control system claim 1, wherein the micro control system includes a controller for controlling direct current.

6. The micro control system claim 1, wherein the micro control system includes a controller for controlling quadrature current.

7. A motor control system comprising:
an analog-to-digital converter (ADC) for receiving N-phase measurements from stator windings;
a processor wherein the processor receives digital values of the N-phase measurements from the ADC; wherein the processor is configured to generate N-dimension current vectors from superposition of selected ones of the digital values of the N-phase measurements;
a non-volatile program memory wherein the non-volatile program memory includes an angular position determination (APD) algorithm; wherein APD algorithm determines the angular position based on the N-dimension current vectors;
a pulse-width modulation (PWM) driver wherein the PWM driver generates a set of input vectors;
an APD controller for controlling a signal generator; wherein the signal generator generates signals for the PWM driver.

8. The micro control system of claim 7, wherein the N-dimension current vectors are fundamental vectors.

9. The micro control system claim 7, wherein the angular position determination is determined by:

$$\theta = \tan^{-1}\left(-\frac{\sum_{n=1}^{N} x_n \cdot \sin\left(\frac{2\pi \cdot (n-1)}{N}\right)}{\sum_{n=1}^{N} x_n \cdot \cos\left(\frac{2\pi \cdot (n-1)}{N}\right)}\right)$$

wherein said $x_n$ is stator voltage level.

10. The micro control system of claim 7, wherein the selected ones of the digital values of the N-phase measurements are identified for each of the N-phase measurements by determining a largest absolute value of a difference between stator current levels from the positive magnitude vector and the negative magnitude vector.

11. The micro control system claim 7, wherein the micro control system includes a controller for controlling direct current.

12. The micro control system claim 7, wherein the micro control system includes a controller for controlling quadrature current.

* * * * *